(12) United States Patent
Gaudfrin

(10) Patent No.: US 7,754,078 B2
(45) Date of Patent: Jul. 13, 2010

(54) FILTERING ELEMENT FOR LIQUIDS FILTERING INSTALLATION COMPRISING SAME

(76) Inventor: Guy Gaudfrin, 8, allée du Bec de Canard, F-78860 Saint Nom la Brèteche (FR)

(*) Notice: Subject to any disclaimer, the term of this patent is extended or adjusted under 35 U.S.C. 154(b) by 336 days.

(21) Appl. No.: 11/663,462

(22) PCT Filed: Sep. 23, 2004

(86) PCT No.: PCT/FR2004/002405

§ 371 (c)(1),
(2), (4) Date: Sep. 19, 2007

(87) PCT Pub. No.: WO2006/032736

PCT Pub. Date: Mar. 30, 2006

(65) Prior Publication Data

US 2008/0164201 A1    Jul. 10, 2008

(51) Int. Cl.
*B01D 29/00* (2006.01)
*B01D 46/00* (2006.01)
(52) U.S. Cl. .............. 210/323.1; 210/345; 210/346; 210/451; 210/486; 55/341.1; 55/341.6; 55/483; 55/493
(58) Field of Classification Search .......... 210/323.1, 210/346, 345; 55/493
See application file for complete search history.

(56) References Cited

U.S. PATENT DOCUMENTS 3,698,161 A * 10/1972 Brixius et al. ............... 55/493
4,789,474 A * 12/1988 Gaudfrin ................ 210/333.01
4,790,935 A    12/1988 Johnson et al.

FOREIGN PATENT DOCUMENTS

DE    3203112 A1 *  8/1983
EP    0 226 478 A    6/1987
GB    1335068 A  * 10/1973
WO    90/05035 A    5/1990

* cited by examiner

*Primary Examiner*—Walter D Griffin
*Assistant Examiner*—Denise R Anderson
(74) *Attorney, Agent, or Firm*—Arent Fox LLP

(57) ABSTRACT

The invention concerns a filter for liquids loaded with solid particles, comprising a vessel (52) provided with an inlet for the liquid to be filtered, an outlet for the filtrate emerging into a manifold and a discharge orifice for the sludge of solid particles and wherein is enclosed a plurality of filtering elements (10), each filtering element shaped like an elongated pocket (16) of fabric (12) of filtering media having an upper opening (10) in communication with the outlet and mounted around frames (18) provided with longitudinal drainage channels (30) and suspended to support elements housed in said vessel and comprising a radial pipe (20) forming a manifold wherein emerges the opening of the filtering elements. The invention is characterized in that the upper edge of said pockets is provided with a hem (17) receiving a stiffening element (19) and urged to be tightly fixed in a peripheral catching element (21) integral with said support elements.

19 Claims, 4 Drawing Sheets

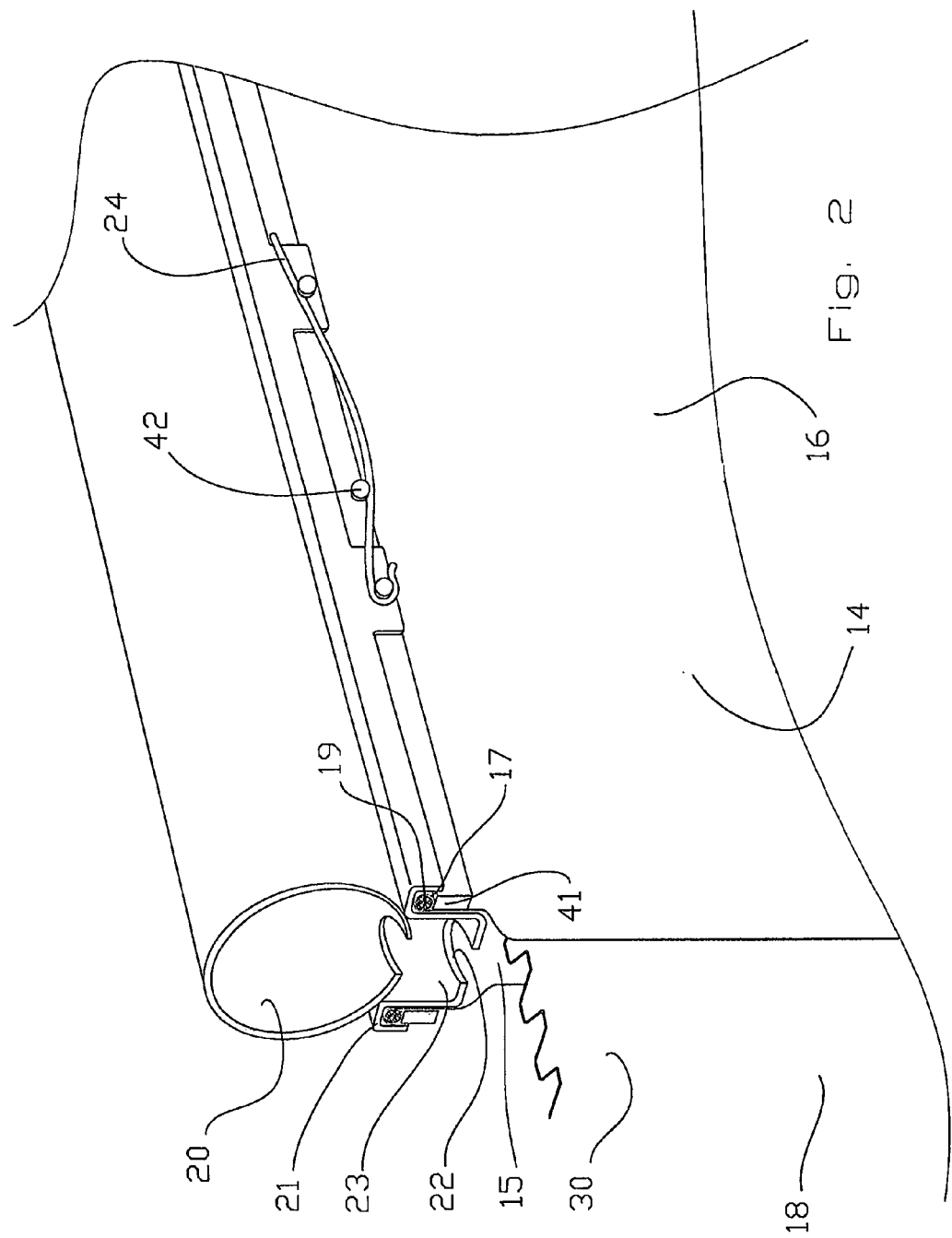

FILTERING ELEMENT FOR LIQUIDS FILTERING INSTALLATION COMPRISING SAME

CROSS-REFERENCE TO RELATED APPLICATION

This application is a National Stage entry of International Application Number PCT/FR2004/002405, filed Sep. 23, 2004. The disclosure of the prior application is hereby incorporated herein in its entirety by reference.

The present invention relates to a filter for liquids loaded with solid particles and to a filtering installation including one or more filters of said type.

The basic principle of the filtering technique consists of passing the loaded liquid through a filtering medium which retains the solid particles and thus separates them from the filtrate.

The filter described in EP 0 226 478 includes a vessel provided with an inlet for the liquid to be filtered, an outlet for the filtrate emerging into a manifold and a discharge orifice for the sludge of solid particles and wherein is enclosed a plurality of filtering elements. Each filtering element is made of elongated pockets of fabric of filtering media which have an upper opening in communication with the outlet. Said pockets are mounted around frames provided with longitudinal drainage channels and suspended to support elements housed in said vessel and including in particular a radial pipe forming a manifold wherein emerges the opening of the filtering elements.

The mode of attaching the pockets to the support elements consists of pinning their upper edge against the manifold tube and immobilising them by means of retaining plates and clamps.

However, said mode of attachment is not satisfactory because during assembly of the fabric folds are formed which are then the seat of leaks or liquid infiltrations affecting the leaktightness of the device and thus the quality of the filtering.

Furthermore, it is necessary to plan cut-outs of the fabric at the locations of the retaining plates.

The frames described are produced in the form of two corrugated sheet metal plates which are welded back-to-back delimiting drainage channels the depth of which is not sufficient in particular when the pressure in the vessel is high and that the fabric is closely pinned against the frames deepening at the locations of the channels that it may go so far as to block.

Still in EP 0 226 478, it is planned to place the filtering elements in a star shape in the vessel.

That said, said arrangement does not provide an optimum filling of the volume of the vessel and the filtering installation therefore has a significant bulkiness for the filtering surface offered.

Finally, maintenance of the filtering installation involves the dismantling of the filtering elements which is a tedious operation due to the fact that said elements are all connected to a manifold which is attached on the outer periphery of the vessel.

The aim of the present invention is to solve said technical problems satisfactorily. Said aim is achieved according to the invention by means of a filter characterised in that said upper edge of said pockets is provided with a hem receiving a stiffening element and urged to be tightly fixed in a peripheral catching groove integral with said support elements.

According to one other characteristic, said filter includes locking means of the hem of said pockets wherein said groove consisting of a forced support element of said hem in the bottom of said groove and engaging with a grasping element of the stiffening element.

According to one variant, said forced support element consists of a spring rod hinged on said support elements. Preferably, said grasping element is a pin supported by a mounted tightening lath resting in the groove, towards the top, against the stiffening element and, laterally via the exterior, against the fabric and the support elements.

According to one other characteristic, said frames are made of a single corrugated plate delimiting, on either side between its corrugations, drainage channels and supporting in the upper portion suspension cleats.

According to one specific variant, said plate is symmetrical in relation to its central axis and has, at its lateral ends, an edge perpendicular to its overall plane.

According to yet another characteristic, said support elements include a lower cradle provided with holes for the suspension of frames which communicate in the top portion with the radial pipe forming a manifold.

Advantageously, the inner perimeter of said groove is at least equal to that of said pockets of a same filtering element.

Another aim of the invention is a filtering installation incorporating a filter having the above defined characteristics and characterised in that said filtering elements are distributed in said vessel radially in a double-star and in two series offset angularly.

Preferably, the inside radius of the first star-shaped series is equal to one third of the inside radius of the vessel whereas the inside radius of the second star-shaped series is equal to two thirds of the inside radius of said vessel.

According to one variant, the respective manifolds of the two series of filtering elements are offset in height in said vessel.

It is also planned that the respective manifolds of the adjacent filtering elements of each one of the two series emerge grouped in a convergent connected to the manifold. According to one specific characteristic of said installation, the manifolds of the filtering elements are connected to a manifold placed inside and at the centre of said vessel.

Preferably, the outlet of the central manifold is located in the bottom portion of the vessel.

According to one other variant, the filtering elements and the central manifold are assembled so as to form an assembly that can be extracted from the vessel.

According to yet another variant that can be fitted to a manifold outside of the vessel and to a central manifold, the outlet ends of the manifolds are connected in a leaktight and removable way to the manifold via seals and tightening elements applying to them an elastic radial force.

The filter of the invention has reinforced leaktightness between the fabric and the manifold due to the absence of folds which improves the yield and the quality of the filtering and facilitates the assembly and dismantling operations.

In particular, the locking mode of the hem of the fabric in the groove by means of tensioning and elastic blocking elements, allows the dimensional deviations of the pockets resulting either from the internal pressure or from the ageing of the material to be compensated.

Furthermore, with identical overall thickness, the new embodiment of the frames in a single corrugated plate allows a greater degree of stiffness to be obtained whilst offering a smaller pressure drop. The possible use henceforth of thinner plates allows a weight gain and substantial savings of the manufacturing costs.

The arrangement in double star of the filtering elements allows, moreover, the volume of the vessel to be reduced and, combined with the presence a central manifold, the compactness of the installation to be increased whilst optimising the filtering surface.

In addition, in the event of clogging, the maintenance operations are facilitated due to the fact that all of the filtering elements are integral with the central manifold and may be extracted from the vessel in a single lifting operation.

The invention will be better understood by reading the description which will follow referring to the drawings on which;

FIG. 2 is a partially cut-away detailed view of the filter from FIG. 1.

The filter shown in the figures is intended for the filtering of liquids loaded with solid particles. Said filter includes a cylindrical vessel 52 (FIGS. 4A, 4B) provided with an inlet for the liquid to be filtered, an outlet for the filtrate and a discharge orifice for the residual sludge of solid particles.

Figure 1:
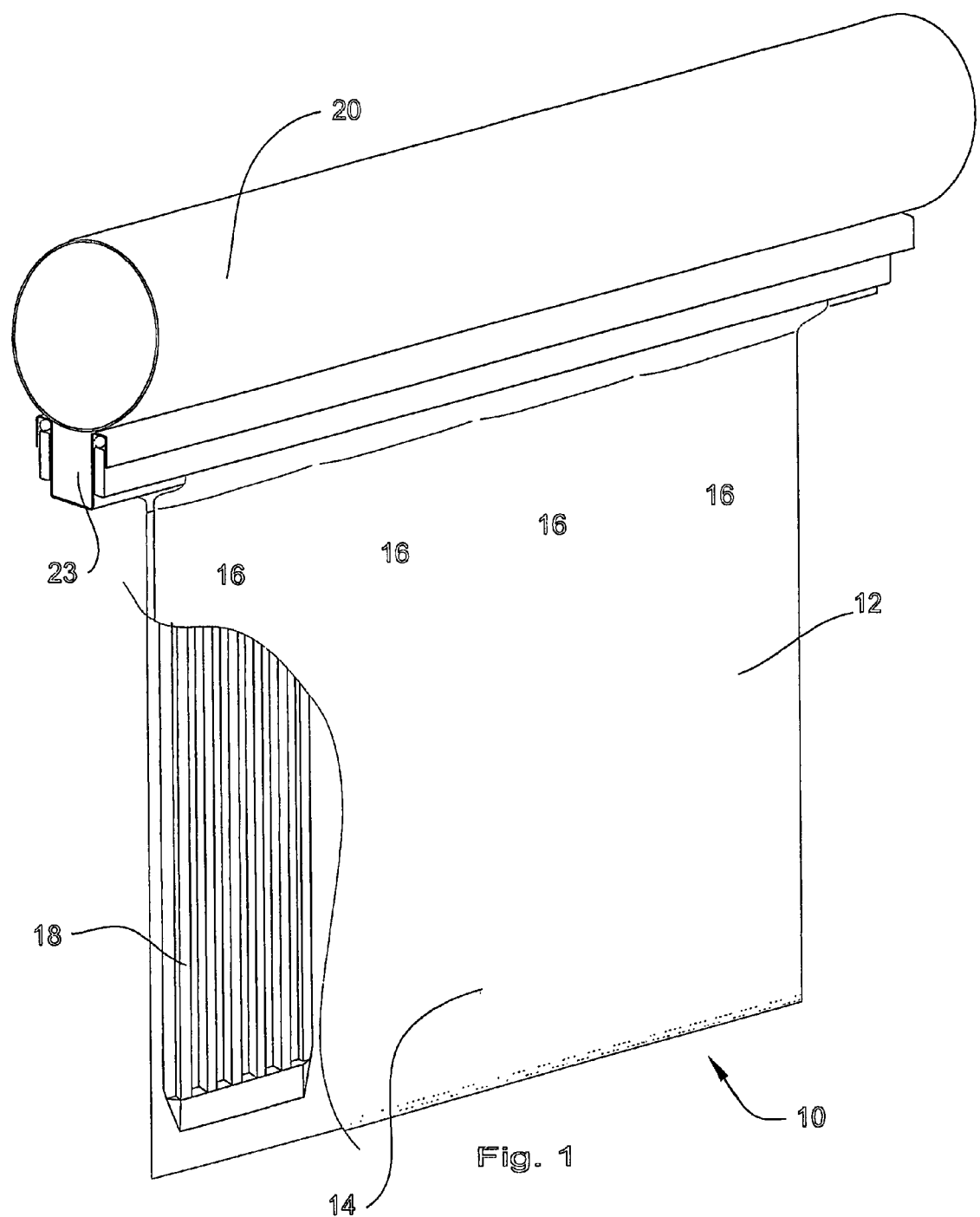
FIG. 1 shows an overall perspective view of one embodiment of a filter according to the invention.

The vessel encloses a plurality of filtering elements 10 such as the one shown in particular in FIGS. 1 and 2. Each filtering element 10 is made of juxtaposed pockets 16 produced by means of a fabric of filtering media 12 with vertical seams 14. The pockets 16 are elongated and mounted around frames 18 as described in EP 0 226 478 delimiting with said latter longitudinal drainage channels 30 (FIG. 2).

The pockets 16 are closed at their bottom end and have an upper opening 15 in indirect communication with the outlet.

The frames 18 are suspended to support elements housed in the vessel 52.

Said support elements consist on one hand, of a radial pipe 20 and, on the other hand, of a lower cradle 23 provided with holes 22 for the suspension of frames 18. The cradle 23 wherein emerges the opening of the pockets 16, communicates in the top portion with the pipe 20 forming a manifold, directly or, as in the variant shown, via openings arranged in the lower wall of said pipe.

As shown in detail in FIG. 2, the upper edge of the pockets 16 is provided with a hem 17 suitable for receiving a stiffening element here in the form of a ring 19 here with a round cross-section, having, preferably a longitudinal flexibility and an elastic crushing capacity. The hem 17 is tightly attached in a peripheral catching groove 21 integral with the support elements of the frames 18 and which, in the embodiment shown, is supported laterally by the cradle 23 (see FIGS. 2 and 3) being produced in the form of a profile of a single part with cylindrical ends.

It would also be possible to produce the pipe 20, the cradle 23 and the groove 21 from a single profile.

The filter of the invention further includes locking means of the hem 17. Said means include a forced support element of the hem 17 in the groove 21 in the form, for example, of a spring rod 24 here hinged on the cradle 23, engaging with a grasping element of the stiffening element.

In the embodiment shown, the grasping element is a pin 42 supported by a mounted tightening lath 41 resting in the groove 21, toward the top against the ring 19 and, laterally, against the fabric 12 and the outer wall of the cradle 23 of the support elements. The tightening lath 41 contours the profile of the groove 21 in cross-section and in contour as is apparent in FIGS. 3 and 3A.

According to one variant not shown, the grasping element consists of a tooth or a hook inserted below the inside edge of the lath 41.

The inner perimeter of the groove 21 is at least equal to that of the pockets 16 of a same filtering element 10.

Figure 3A:
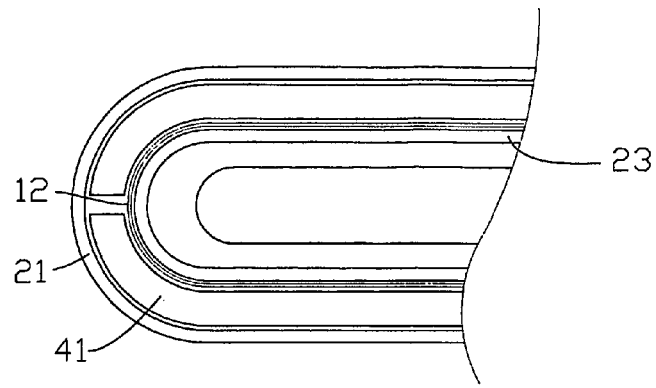
FIGS. 3, 3A and 3B are respectively partial vertical cross-sectional and horizontal cross-sectional views according to plans AA and BB of the filter from FIG. 1.
Figure 3:
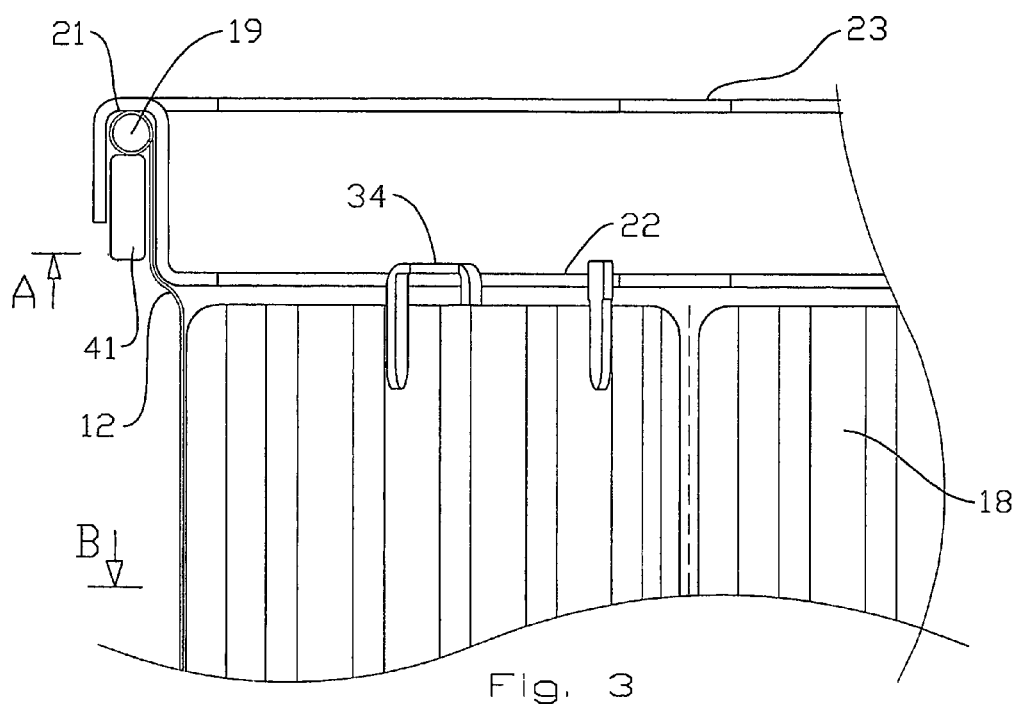
Figure 3B:
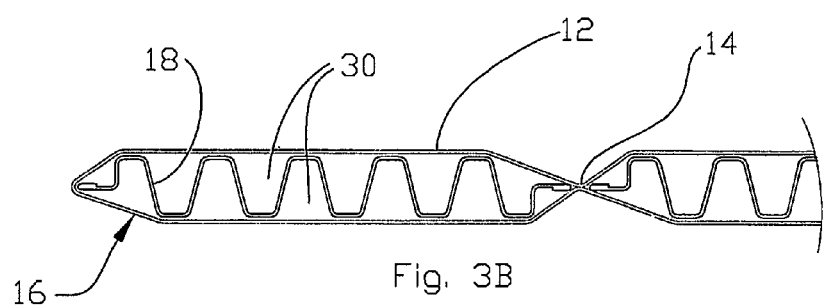

Said arrangement which is apparent in FIGS. 3A and 3B, allows the formation of folds to be prevented between the outer wall of the cradle 23 and the tightening lath 41 which are likely to appear due to shrinking of the fabric width ways during introduction of the frames 18 in the pockets 16.

The frames 18 are made, according to the invention, of a single corrugated plate in metal or in a rigid plastic material delimiting, on either side and between its corrugations, the drainage channels 30. Said channels may, if necessary, be equipped with discs (not shown) for imposing a circulation direction of the liquid between the frame and the pocket. Said plate is symmetrical in relation to its central axis and supports in the upper portion suspension cleats 34 inserted in the holes 22 of the cradle 23.

The corrugations located at the lateral ends of the frame plate have an outer edge perpendicular to the overall plane of the plate so as to organise a better passage for the filtrates as shown in FIG. 3B.

Figure 4A:
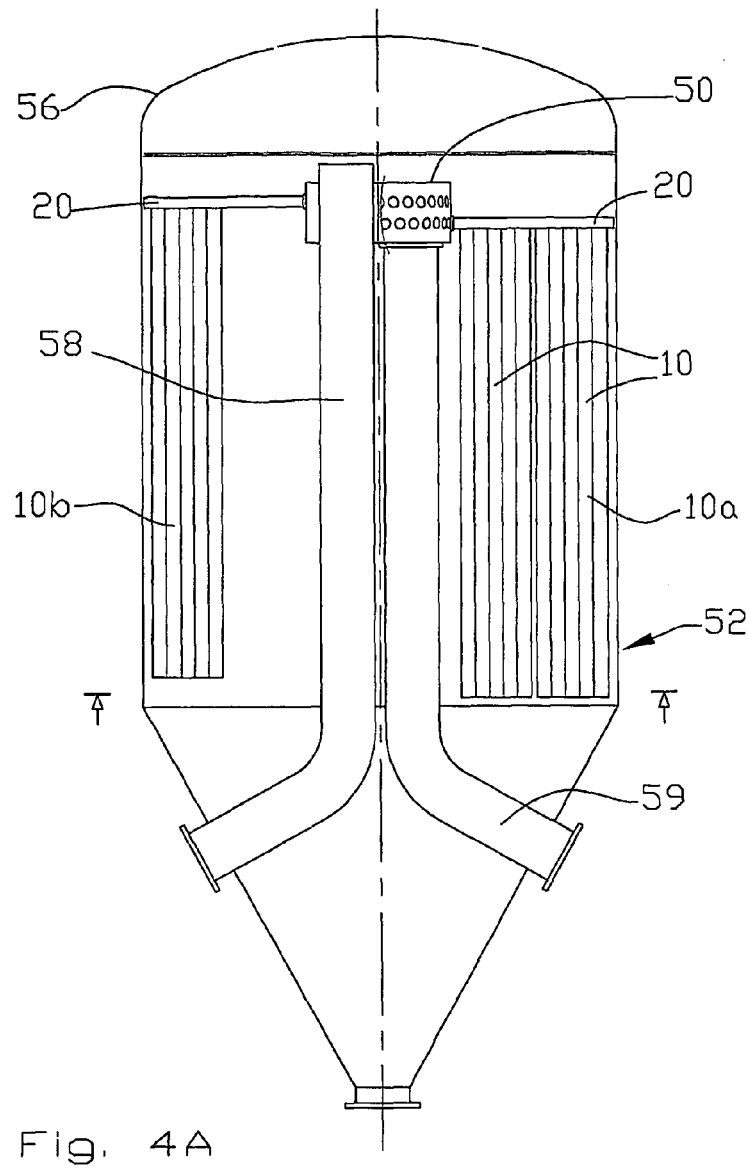
FIGS. 4A and 4B are respectively vertical and horizontal cross-sectional views according to CC of one alternative embodiment of the filter of the invention.
Figure 4B:
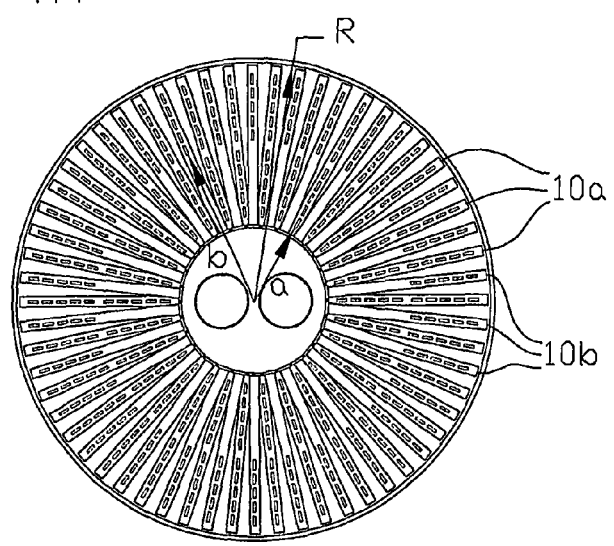

FIGS. 4A and 4B show a filtering installation equipped with the filter of the invention one embodiment of which has been previously described.

In said installation, the filtering elements 10 are distributed inside the vessel 52 according to a radial arrangement in double star and in two series 10a, 10b offset angularly.

As shown in FIG. 4B in top view, the inside radius a of the first series 10a of filtering elements is equal to one third of the inside radius R of the vessel 52 whereas the inside radius b of the second series 10b is equal to two thirds of the radius R of said vessel.

Said distribution frees, inside the vessel, a central cylindrical space the diameter of which is equal to one third of the diameter of the vessel and wherein is placed a filtrate recovery manifold 58 wherein emerge the manifolds 20.

The first series 10a of filtering elements consists of two juxtaposed and co-planar units whereas the second series 10b consists of a single filter unit.

Thus, alternatively is found in the vessel, a filter of the first series 10a then a filter of the second series 10b.

In the embodiment of FIG. 4A, the manifold 58 comprises, in the upstream portion, a connection box 50 supplied by the manifolds 20 of the two series 10a, 10b of filtering elements 10.

The box 50 has two tiered rows of connection orifices.

The lower row receives the stub ends of the manifolds of the first series 10a which is offset in height in the vessel in relation to the manifolds of the second series 10b.

The outlet 59 of the manifold 58 is located in the bottom portion of the vessel 52.

The filtering elements 10 and the manifold 58 are assembled in order to form an assembly that can be extracted preferably via the top of the vessel 52 after disengaging the cover 56.

The outlet ends of the manifolds 20 are connected in a leaktight and removable way to the manifold 58 via seals and tightening elements allowing an elastic radial force to be applied to them and without causing crushing.

In one embodiment with an outer manifold, it is planned that the respective manifolds 20 of the adjacent filtering elements 10 of each one of the series 10a, 10b emerge grouped in a convergent (not shown) connected to the peripheral manifold 58.

The invention claimed is:

1. A filter for liquids loaded with solid particles comprising:
   a vessel provided with an inlet for the liquid to be filtered, an outlet for the filtrate emerging from a central manifold and a discharge orifice for the sludge of solid particles;
   a plurality of filtering elements enclosed in the vessel, each filtering element being made of elongated pockets of fabric of filtering media which have an upper opening and which are mounted around frames provided with longitudinal drainage channels;
   support elements housed in said vessel, each support element comprising a radial pipe forming a manifold and an integral peripheral catching groove, wherein the frames of the filtering elements are suspended from the support elements so that the upper opening of the filtering elements communicate with the outlet through the manifold; and
   a locking means comprising a tightening lath mounted in the peripheral catching groove, a grasping element supported by the lath, and a forced support element, wherein an upper edge of said pockets is provided with a hem and a single stiffening element positioned in the hem, and
   wherein the forced support element engages the grasping element to urge the tightening lath against the stiffening element to lock the stiffening element of the hem in the catching groove.

2. A filter according to claim 1, wherein said forced support element consists of a spring rod hinged on said support elements.

3. A filter according to claim 1, wherein said grasping element is a pin.

4. A filter according to claim 3, wherein said grasping element is a pin.

5. A filter according to claim 1, wherein said frames are made of a single corrugated plate delimiting, on either side between its corrugations, drainage channels and supporting in the upper portion suspension cleats.

6. A filter according to claim 5, wherein said plate is symmetrical in relation to its central axis and has, at its lateral ends, an edge perpendicular to its overall plane.

7. A filter according to claim 1, wherein said support elements include a lower cradle provided with holes for the suspension of the frames which communicate in the top portion with the radial pipe forming the manifold.

8. A filter according to claim 1, wherein the inner perimeter of said groove is at least equal to that of said pockets of a same filtering element.

9. A filtering installation incorporating a filter for liquids loaded with solid particles, comprising:
   a vessel provided with an inlet for the liquid to be filtered, an outlet for the filtrate emerging from a central manifold, and a discharge orifice for the sludge of solid particles;
   a plurality of filtering elements enclosed in the vessel, each filtering element being made of elongated pockets of fabric of filtering media which have an upper opening and which are mounted around frames provided with longitudinal drainage channels;
   support elements housed in said vessel, each support element comprising a radial pipe forming a manifold and an integral peripheral catching groove, wherein the frames of the filtering elements are suspended from the support elements so that the upper opening of the filtering elements communicate with the outlet through the manifold; and
   a locking means comprising a tightening lath mounted in the peripheral catching groove, a grasping element supported by the lath, and a forced support element, wherein an upper edge of said pockets is provided with a hem and receiving a single stiffening element positioned in the hem,
   wherein the forced support element engages the grasping element to urge the tightening lath against the stiffening element to lock the stiffening element of the hem in the catching groove, and
   wherein said filtering elements are distributed in said vessel radially in a double-star and in two series offset angularly.

10. A filtering installation according to claim 9, wherein the inside radius of the first star-shaped series is equal to one third of the inside radius of the vessel whereas and the inside radius of the second star-shaped series is equal to two thirds of the inside radius of said vessel.

11. An filtering installation according to claim 9, wherein said respective manifolds of the two series of the filtering elements are offset in height in said vessel.

12. A filtering installation according to claim 9, wherein said respective manifolds of the adjacent filtering elements of each one of the series emerge grouped in a convergent connected to the central manifold.

13. A filtering installation according to claim 9, wherein said central manifold is placed inside and at the centre of said vessel.

14. A filtering installation according to claim 13, wherein said outlet of the central manifold is located in the bottom portion of the vessel.

15. A filtering installation according to claim 13, wherein the filtering elements and the central manifold are assembled so as to form an assembly that can be extracted from the vessel.

16. A filtering installation according to claim 9, wherein the outlet ends of the manifolds are connected in a leaktight and removable way to the central manifold via seals and tightening elements.

17. A filtering installation according to claim 14, wherein the filtering elements and the central manifold are assembled so as to form an assembly that can be extracted from the vessel.

18. A filter for liquids loaded with solid particles comprising:
   a vessel provided with an inlet for the liquid to be filtered, an outlet for the filtrate emerging from a central manifold, and a discharge orifice for the sludge of solid particles;
   a plurality of filtering elements enclosed in the vessel, each filtering element being made of elongated pockets of fabric of filtering media which have an upper opening and which are mounted around frames provided with longitudinal drainage channels;
   support elements housed in said vessel, each support element comprising a radial pipe forming a manifold and an integral catching zone, wherein the frames of the filtering elements are suspended from the support elements so that the upper opening of the filtering elements communicate with the outlet through the manifold; and
   a locking means comprising a tightening lath, a grasping element supported by the lath, and a forced support element, wherein an upper edge of said pockets is provided with a hem and a single stiffening element positioned in the hem, and wherein the forced support element engages the grasping element to urge the tightening lath against the stiffening element to force the stiffening element of the hem against the catching zone.

19. A filtering installation incorporating a filter for liquids loaded with solid particles, comprising:
- a vessel provided with an inlet for the liquid to be filtered, an outlet for the filtrate emerging from a central manifold, and a discharge orifice for the sludge of solid particles;
- a plurality of filtering elements enclosed in the vessel, each filtering element being made of elongated pockets of fabric of filtering media which have an upper opening and which are mounted around frames provided with longitudinal drainage channels;
- support elements housed in said vessel, each support element comprising a radial pipe forming a manifold and an integral peripheral catching zone, wherein the frames of the filtering elements are suspended from the support elements so that the upper opening of the filtering elements communicate with the outlet through the manifold; and
- a locking means comprising a tightening lath, a grasping element supported by the lath, and a forced support element, wherein an upper edge of said pockets is provided with a hem and a single stiffening element positioned in the hem,
- wherein the forced support element engages the grasping element to urge the tightening lath against the stiffening element to force the stiffening element of the hem against the catching zone; and
- wherein said filtering elements are distributed in said vessel radially in a double-star and in two series offset angularly.

* * * * *